US012106896B2

(12) United States Patent
Lee

(10) Patent No.: US 12,106,896 B2
(45) Date of Patent: Oct. 1, 2024

(54) VEHICLE AND METHOD OF CONTROLLING SEAT FOR VEHICLE

(71) Applicant: HYUNDAI MOBIS CO., LTD., Seoul (KR)

(72) Inventor: Jung Su Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 222 days.

(21) Appl. No.: 17/896,166

(22) Filed: Aug. 26, 2022

(65) Prior Publication Data

US 2023/0154659 A1    May 18, 2023

(30) Foreign Application Priority Data

Nov. 17, 2021  (KR) .......................... 10-2021-0158187

(51) Int. Cl.
*H01F 6/00* (2006.01)
*B60N 2/427* (2006.01)
*H01F 6/06* (2006.01)

(52) U.S. Cl.
CPC ......... *H01F 6/006* (2013.01); *B60N 2/42736* (2013.01); *B60N 2/4279* (2013.01); *H01F 6/06* (2013.01)

(58) Field of Classification Search
CPC .......... B60N 2/062; B60N 2/06; B60N 2/005; B60N 2/0224; B60N 2/015; B60N 2/04; B60N 2/14; B60N 2/4279; B60N 2/0244; B60N 2/42736; H01F 7/0236; H01F 7/202; H01F 6/06; H01F 6/006; H01F 6/00

USPC .......................................................... 361/141
See application file for complete search history.

(56) References Cited

U.S. PATENT DOCUMENTS 5,298,875 A * 3/1994 Laibowitz ............... B61B 13/08
                                                         310/12.32
2017/0179805 A1* 6/2017 Lu ............................. H02P 8/00
2019/0023161 A1* 1/2019 Sullivan .................. B60N 2/161

FOREIGN PATENT DOCUMENTS

KR          2012036439 A  *  4/2012

OTHER PUBLICATIONS

Machine translation of Woo Korean Patent Document KR 2012-0036439 A Apr. 2012 (Year: 2012).*

* cited by examiner

*Primary Examiner* — Kevin J Comber
(74) *Attorney, Agent, or Firm* — NovoTechIP International PLLC

(57) ABSTRACT

Embodiments disclose a vehicle including: a magnet unit disposed under a seat and on which a plurality of magnets are disposed; an electromagnetic unit disposed on a floor of a vehicle compartment and including a plurality of electromagnets; and a control unit configured to control the electromagnetic unit, wherein the control unit moves the seat to a preset position on the electromagnetic unit by controlling current applied to each of the electromagnets. Accordingly, the vehicle can improve the degree of freedom in design in a vehicle compartment while providing a passenger's convenience by implementing a seat movement mechanism suitable for the era of autonomous traveling.

20 Claims, 8 Drawing Sheets

(a)

(b)

VEHICLE AND METHOD OF CONTROLLING SEAT FOR VEHICLE

CROSS-REFERENCE TO RELATED APPLICATIONS

This application claims the benefit of priority to Korean Patent Application No. 10-2021-0158187, filed on Nov. 17, 2021, the disclosure of which is incorporated herein by reference in its entirety.

TECHNICAL FIELD

Embodiments relate to a vehicle and a method of controlling a seat for the vehicle. Specifically, embodiments relate to a vehicle and a method of controlling a seat for the vehicle having an improved structure in order to freely move the seat using a magnetic levitation force, provide a passenger's convenience through the movement, and secure a space within a vehicle compartment.

BACKGROUND

Seats for passengers (occupants) may be disposed in the interior of a vehicle.

FIG. 1 is a view showing a conventional seat and the movement relationship of the seat.

Referring to FIG. 1, a conventional vehicle may include a seat 2 disposed in a vehicle compartment and a rail 3 configured to guide the movement of the seat 2. Here, the rail 3 may be disposed on a floor 4 in the vehicle compartment.

There is a problem that a moving direction and moving range of the seat 2 are restricted by the rail 3 because the conventional seat 2 disposed in the vehicle moves along the rail 3. For example, since the seat 2 is movably fixed to the rail 3, only limited movement is possible.

Accordingly, in a situation in which autonomous vehicles are becoming more common, there is a limit in responding to postures of passengers seated on the seat 2, various positions of the seat 2 according to the postures, and the like.

In addition, there is a problem in that a vehicle compartment space provided for the interior and the like becomes narrow due to the arrangement of the rail 3 in the vehicle compartment.

Accordingly, there is a demand for a vehicle capable of securing an interior space in the vehicle compartment for interior design as well as satisfying the passenger's need for freely changing the position of the seat.

SUMMARY

Embodiments are directed to providing a vehicle and a method of controlling a seat for the vehicle capable of freely changing a position of the seat using a magnetic levitation force.

Embodiments are directed to providing a vehicle and a method of controlling a seat for the vehicle that protect passengers by forming a buffer area through the movement of a position of the seat when an impact such as a vehicle collision, or the possibility of collision increases.

Objectives to be solved by the present invention are not limited to the above-described objectives, and other objectives, which are not described above, will be clearly understood by those skilled in the art from the following description.

According to an aspect of the present invention, there is provided a vehicle including: a magnet unit disposed under a seat and at which a plurality of magnets are disposed; an electromagnetic unit disposed on a floor of a vehicle compartment and including a plurality of electromagnets; and a control unit configured to control the electromagnetic unit, wherein the control unit moves the seat to a preset position on the electromagnetic unit by controlling current applied to each of the electromagnets.

Here, the magnetic unit may include a plurality of magnets, and a body at which the magnets are disposed, the magnets may include a first magnet, and a plurality of second magnets disposed to be spaced apart from the first magnet by a predetermined interval, and magnetic polarities of the first magnet and the second magnets may be different.

In addition, a size of the first magnet may be formed to be greater than a size of each of the second magnets.

In addition, the size of the second magnet may be formed to be greater than a size of each of the electromagnets.

In addition, a first separation distance (d1) between the first magnet and the second magnet may be formed to be greater than a second separation distance (d2) between the electromagnets.

Meanwhile, the electromagnetic unit may include a frame, and the plurality of electromagnets disposed to be spaced apart from each other in the frame, and the electromagnets may include a power supply unit controlled by the control unit, and a coil electrically connected to the power supply unit.

In addition, the electromagnetic unit may include a frame, and the plurality of electromagnets disposed to be spaced apart from each other in the frame, and an electromagnet disposed to vertically overlap the first magnet may form the same magnetic polarity as that of the first magnet.

Here, an electromagnet disposed in a moving direction with respect to the moving direction of the seat may form a magnetic polarity different from that of the second magnet by the control unit.

At this time, an electromagnet disposed in an opposite direction to the moving direction may form the same magnetic polarity as that of the second magnet by the control unit.

In addition, when the seat reaches the set position, the control unit may release power applied to the electromagnet. Alternatively, when the seat reaches the set position, some of the electromagnets vertically overlapping the magnet may form magnetic polarities different from the magnet by the control unit.

In addition, an electromagnet disposed adjacent to the second magnet in a rotating direction with respect to the rotating direction of the seat may form a magnetic polarity different from that of the second magnet by the control unit.

At this time, an electromagnet disposed adjacent to the second magnet in an opposite direction to the rotating direction may form the same magnetic polarity as that of the second magnet by the control unit.

In addition, an electromagnet disposed to vertically overlap the second magnet may be in an off state.

Meanwhile, the vehicle may further include a sensor configured to detect a collision, in which the control unit which determines the possibility of collision based on a signal of the sensor may form a buffer area in a vehicle compartment by controlling the electromagnetic unit to move the seat away from a collision position.

In addition, when the collision is detected by the sensor, an electromagnet disposed to vertically overlap the first magnet may form a magnetic polarity different from that of the first magnet.

In addition, the magnet may be a superconducting magnet.

According to another aspect of the present invention, there is provided a method of controlling a seat for a vehicle including: levitating a seat having a magnet disposed on a lower portion by applying power to an electromagnetic unit in which a plurality of electromagnets are disposed; moving the seat by controlling an electromagnet disposed in a moving direction of the seat; and releasing the power applied to the electromagnet when the seat reaches a preset position.

According to still another aspect of the present invention, there is provided a method of controlling a seat for a vehicle including: levitating a seat having a magnet disposed on a lower portion by applying power to an electromagnetic unit in which a plurality of electromagnets are disposed; rotating the seat by controlling an electromagnet disposed in a rotating direction of the seat; and releasing the power applied to the electromagnet when the seat reaches a preset position.

According to embodiments, it is possible to freely change a position of a seat using a magnet disposed under the seat and a plurality of electromagnets disposed on a floor of a vehicle compartment. In other words, according to the embodiments, it is possible to secure production competitiveness by implementing a seat movement mechanism suitable for the era of autonomous traveling of vehicles to provide a passenger's convenience.

According to embodiments, it is possible to secure a space in a vehicle compartment by removing a conventional seat-rail mechanism. Accordingly, it is possible to improve the degree of freedom in interior design in the vehicle compartment through the secured space.

According to embodiments, it is possible to protect passengers who are in a vehicle by forming a buffer area through the movement of a position of a seat when the possibility of the vehicle colliding with external objects increases. At this time, it is possible to further improve stability for the passengers by additionally applying power to an electromagnet to fix the seat to the floor.

Various useful advantages and effects of the embodiments are not limited to the above-described contents and will be more easily understood from descriptions of the specific embodiments.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
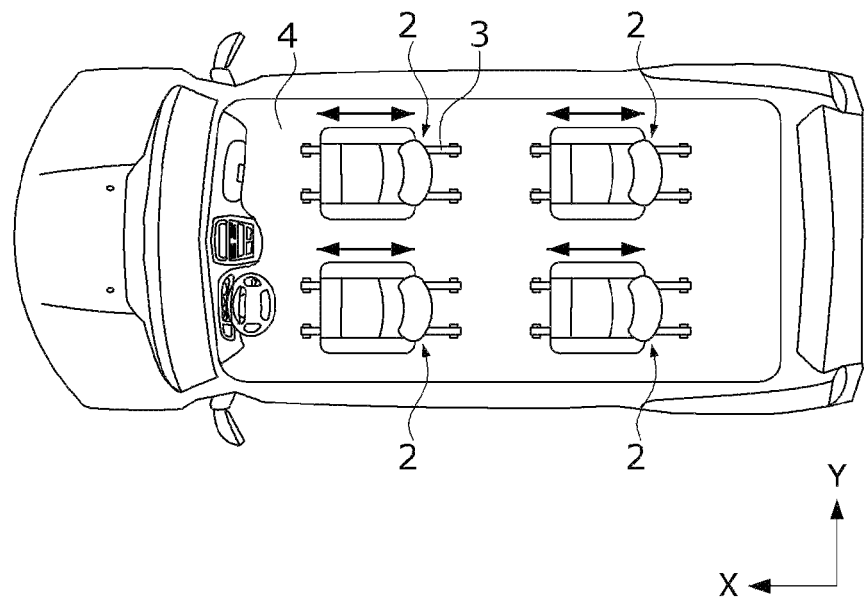
FIG. 1 is a view showing a conventional seat and the movement relationship of the seat.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

In line with the era of autonomous traveling of vehicles and electric vehicles, the convenience of moving a position of a seat is required. Here, a vehicle may include a seat on which a passenger sits and a safety device such as a seat belt for the safety of the passenger.

Accordingly, the vehicle according to embodiment may provide a magnetic levitation force to the seat through a magnet and a plurality of electromagnets disposed under the seat, and control the current applied to the plurality of electromagnets to move, rotate, or fix the seat.

Figure 2:
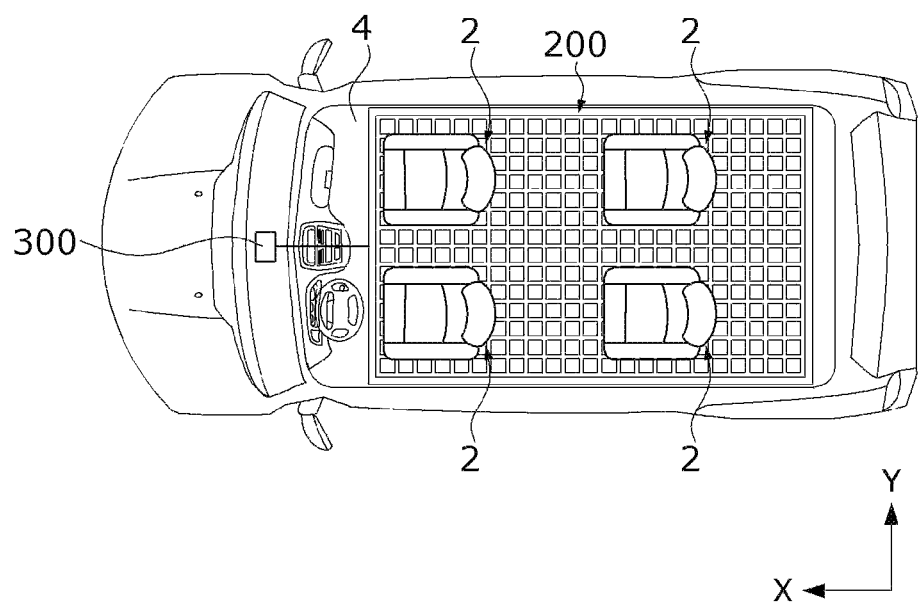
FIG. 2 is a view showing a vehicle according to an embodiment.
Figure 3:
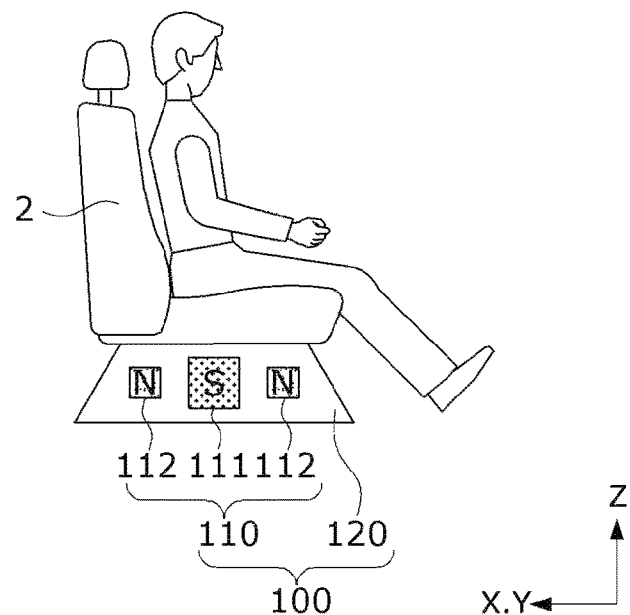
FIG. 3 is a view showing a seat unit of the vehicle according to the embodiment.
Figure 4:
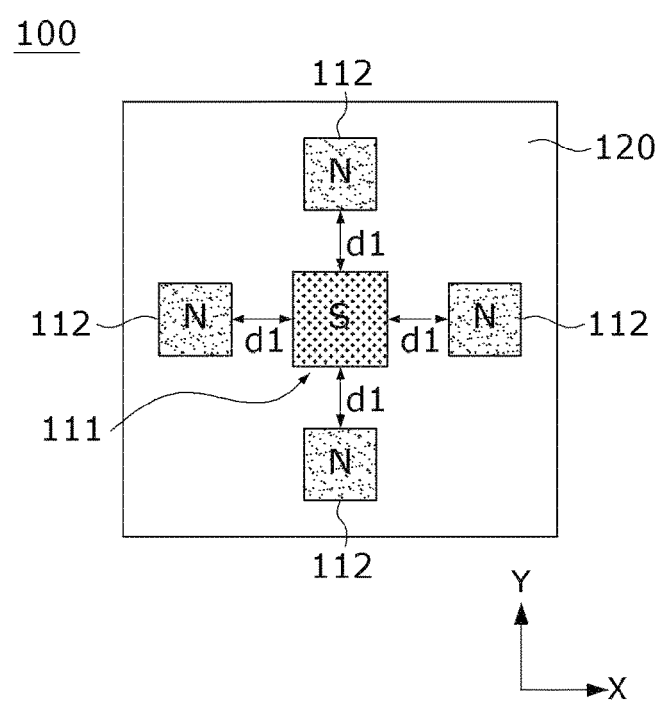
FIG. 4 is a view showing the arrangement relationship of a magnet disposed on the seat unit of the vehicle according to the embodiment.
Figure 5:
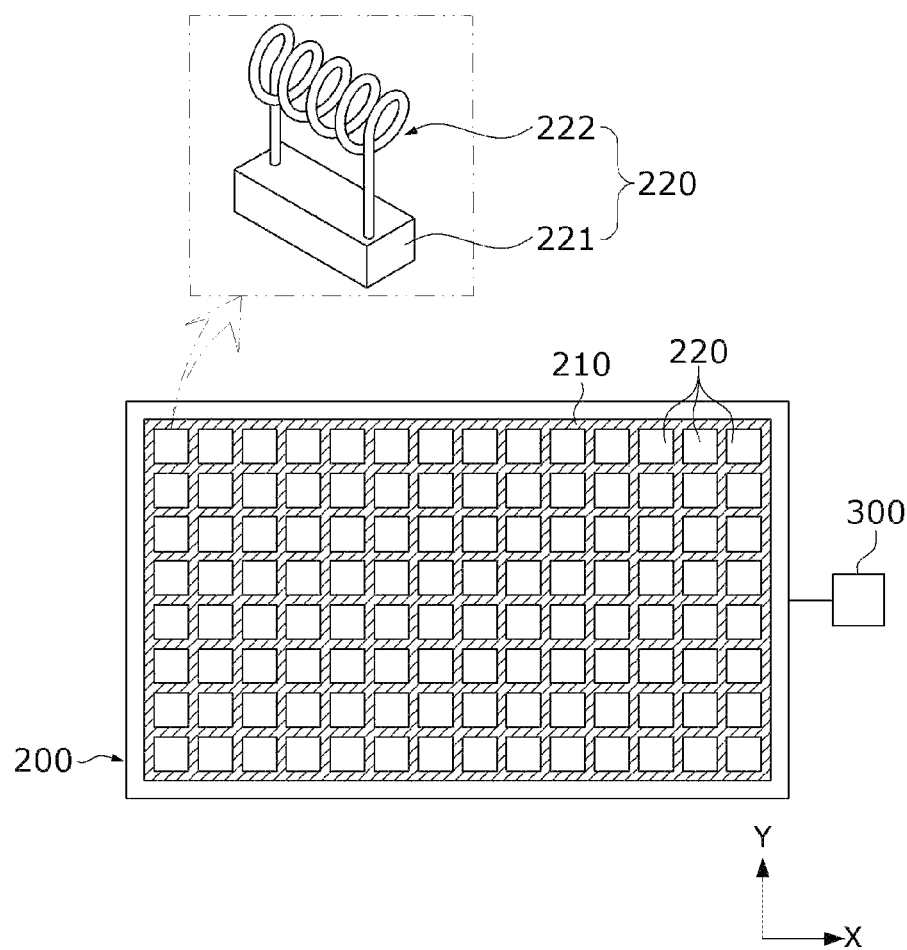
FIG. 5 is a view showing an electromagnet unit of the vehicle according to the embodiment.

FIG. 2 is a view showing a vehicle according to the embodiment, FIG. 3 is a view showing a seat unit for the vehicle according to the embodiment, FIG. 4 is a view showing the arrangement relationship of a magnet disposed on the seat unit for the vehicle according to the embodiment, and FIG. 5 is a view showing an electromagnet unit for the vehicle according to the embodiment. Here, as shown in FIG. 4, an X direction may mean a front-rear direction, an Y direction may mean a vehicle width direction or a horizontal direction, and a Z direction may mean a vertical direction. In addition, the front-rear direction and the vehicle width direction may be perpendicular to each other. In addition, the front-rear direction may include a front direction toward a steering wheel and a rear direction opposite to the front direction. In addition, the vertical direction may include an upward direction toward a ceiling of the vehicle and a downward direction opposite to the upward direction. In addition, the seat unit may mean a seat 2 and a magnet unit 100 coupled to a lower portion of the seat 2.

Referring to FIGS. 2 to 5, the vehicle according to the embodiment may include the magnet unit 100 disposed under the seat 2 and at which a plurality of magnets 110 are disposed, an electromagnet unit 200 disposed on a floor 4 of the vehicle compartment and including a plurality of electromagnets, and a control unit 300 configured to control the electromagnet unit 200. Here, the electromagnet unit 200 may be electrically connected to the control unit 300. At this time, the control unit 300 may be a controller such as an electronic control unit (ECU) or microcontroller unit (MCU).

In addition, the control unit 300 may move the seat 2 to a preset position on the electromagnet unit 200 by controlling flow directions of the power and current applied to each of the electromagnets 220. For example, the control unit 300 may control the electromagnet unit 200 to move the seat from a standby position (current position) to the set position (movement or rotation position).

Referring to FIGS. 3 and 4, the magnet unit 100 may include the plurality of magnets 110 and a body 120 at which the magnets 110 are disposed. In addition, the magnets 110 may include a first magnet 111 and second magnets 112 disposed to be spaced apart from the first magnet 111 to have a predetermined separation distance. Here, the separation distance between the first magnet 111 and each of the second magnets 112 may be referred to as a first separation distance d1.

In addition, magnetic polarities or poles of the first magnet 111 and the second magnets 112 may be different. For example, when the first magnet 111 disposed at a center of the body 120 has an S polarity, the second magnets 112 may have an N polarity.

In addition, the plurality of second magnets 112 may be disposed around the first magnet 111. As shown in FIG. 4, four second magnets 112 may be disposed, two of which are disposed in the front-rear direction and two of which are disposed in the left-right direction, corresponding to side surfaces of the first magnet 111.

Referring to FIG. 4, the size of the first magnet 111 may be formed to be greater than that of the second magnet 112. In other words, it is possible to secure stability when the seat 2 is levitated by forming the horizontal size of the first magnet 111 disposed at the center of the body 120 to be greater than the horizontal size of the second magnet 112. For reference, to control the movement of the seat 2 through a size difference between the magnet 110 and the electromagnet 220, the horizontal size of the electromagnet 220 may be formed to be smaller than the horizontal size of the second magnet 112.

As a magnetic levitation force for the first magnet 111 or the second magnet 112 is formed by the electromagnet unit 200, the seat 2 levitates to a predetermined height.

At this time, since the size of the second magnet 112 is formed to be smaller than that of the first magnet 111, a magnetic force (attraction or repulsive force) generated between the second magnet 112 and the electromagnet 220 may be formed to be smaller than a magnetic force generated between the first magnet 111 and the electromagnet 220. Accordingly, the influence of the magnetic force generated between the second magnet 112 and the electromagnet 220 is smaller than the influence of the magnetic force generated between the first magnet 111 and the electromagnet 220. Here, the magnetic force generated between the first magnet 111 and the electromagnet 220 may be referred to as a first magnetic force, and the magnetic force generated between the second magnet 112 and the electromagnet 220 may be referred to as a second magnetic force.

Accordingly, the vehicle according to the embodiment may secure position stability according to the levitation of the seat 2 by implementing the first magnetic force greater than the second magnetic force through the first magnet 111 greater than the second magnet 112. In addition, it is possible to secure the position stability according to the levitation of the seat 2 by disposing the second magnets 112 symmetrically with respect to the center of the first magnet 111.

Furthermore, the vehicle may further include a load sensor (not shown) disposed on the seat 2. Here, the load sensor may measure a passenger's weight, and transmit a signal including the information to the control unit 300. In addition, the control unit 300 may adjust the levitation height of the seat 2 by adjusting the intensity of power applied to the electromagnet 220 based on the signal. Accordingly, the vehicle may further improve the passenger's convenience.

Meanwhile, the magnet 110 may be provided as a superconducting magnet. Accordingly, the magnet 110 may form a high magnetic field in a certain area.

The body 120 may support the magnet 110. In addition, the body 120 may be formed of a non-magnetic substance such as plastic in order to prevent interference with the magnetic force of the magnet 110.

The electromagnet unit 200 may be disposed on the floor 4 of the vehicle. Accordingly, the electromagnet unit 200 may be installed on the floor 4 instead of a conventional rail 3 having a predetermined height, and thus it is possible to secure a space for the interior of the vehicle compartment. For example, an upper surface of the electromagnet unit 200 may form the same plane as the floor 4, and thus it is possible to secure the space for the interior of the vehicle compartment.

Referring to FIG. 5, the electromagnet unit 200 may include a frame 210 and a plurality of electromagnets 220 disposed to be spaced apart from each other in the frame 210. In addition, each of the electromagnets 220 may include a power supply unit 221 controlled by the control unit 300 and a coil 222 electrically connected to the power supply unit 221. Accordingly, the electromagnet 220 may be referred to as a coil cell.

The frame 210 may support the electromagnet 220.

In addition, the frame 210 may minimize or block the influence between the electromagnets 220 by implementing a partition wall structure. For example, the frame 210 may be made of a non-magnetic substance such as plastic.

In addition, the frame 210 may be formed in a shape corresponding to the shape of the electromagnet 220 in order to prevent the electromagnetic force generated by one electromagnet 220 from interfering with another electromagnet 220. As shown in FIG. 5, the frame 210 may be formed in a grid shape corresponding to the electromagnet 220 formed in a hexahedral shape.

Each of the plurality of electromagnets 220 may be controlled by the control unit 330.

Accordingly, the control unit 300 may generate an electromagnetic force by applying power to the electromagnet 220. In addition, the control unit 300 may release the power applied to the electromagnet 220, that is, block the formation of the electromagnetic force by releasing the power.

In addition, when the power is applied, the control unit 300 may implement an S polarity or an N polarity in the electromagnet 220 by controlling a direction of the current flowing through the coil 222.

Meanwhile, the electromagnets 220 may be disposed to have a predetermined second separation distance d2. Here, the first separation distance d1 may be formed to be greater than the second separation distance d2 between the electromagnets 220.

Accordingly, the vehicle facilitates a movement control of the seat 2 by not only differentiating the sizes of the magnet 110 and the electromagnet 220 but also forming the separation distances d1 and d2 differently. For example, through the difference in size and the difference in the separation distances d1 and d2, the control unit 300 finely controls the movement of the seat 2 to enable smooth movement of the seat 2. Accordingly, the vehicle can minimize vibration and noise generated when the seat 2 is moved.

Figure 6:
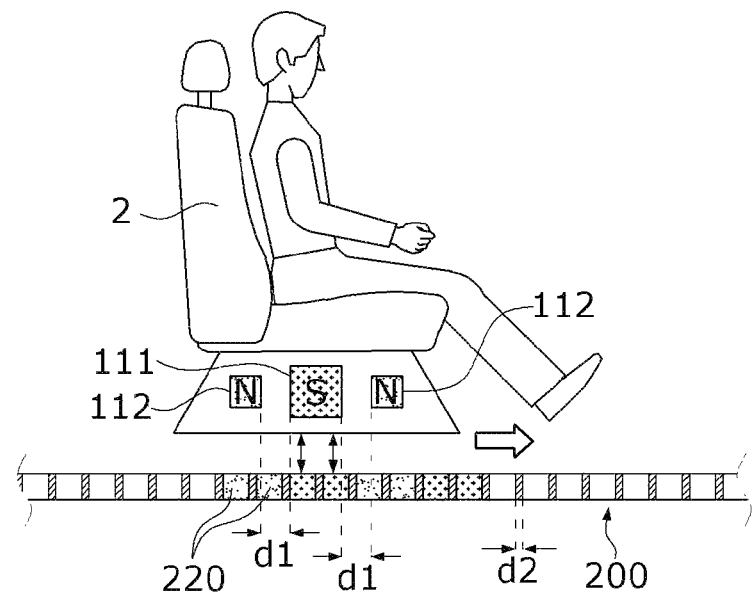
FIGS. 6 and 7 are views showing a movement mechanism of the seat unit of the vehicle according to the embodiment.
Figure 7:
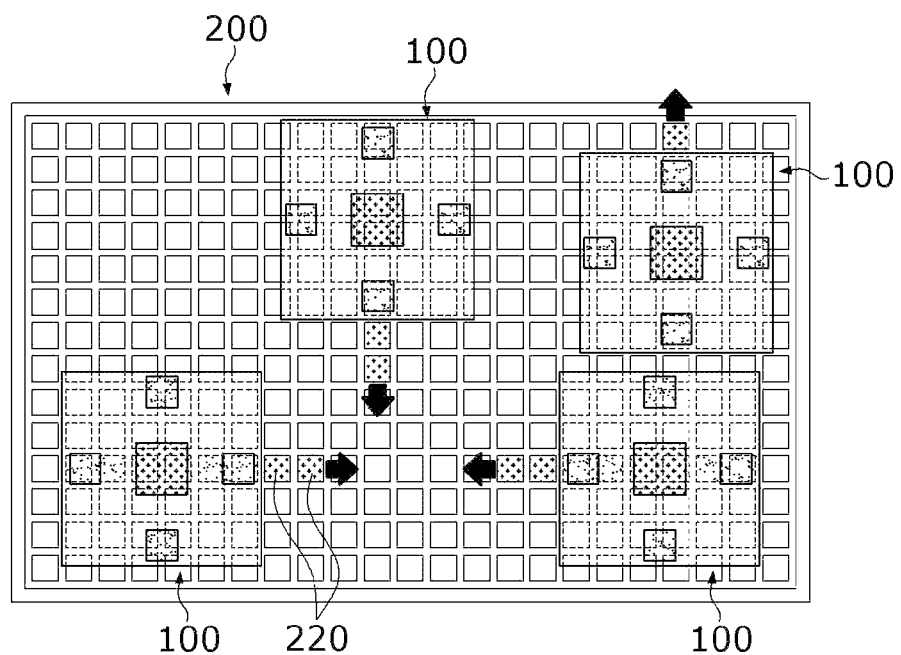
Figure 8:
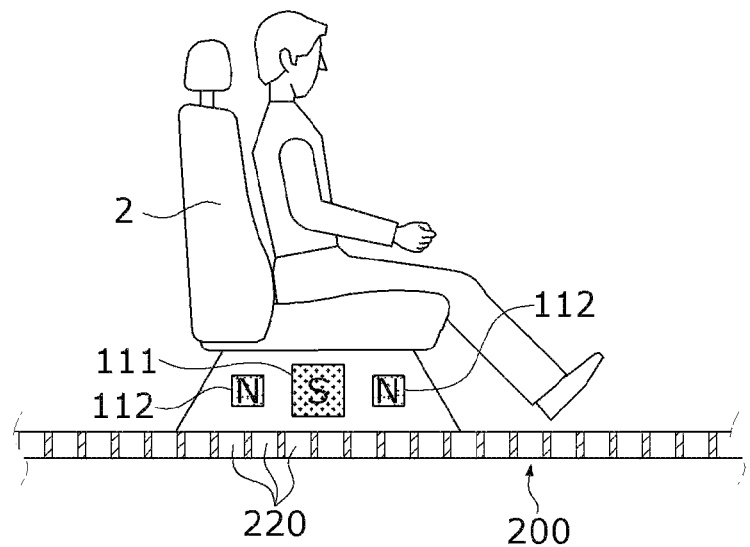
FIGS. 8 and 9 are views showing the seat unit fixed to the electromagnet unit of the vehicle according to the embodiment.
Figure 9:
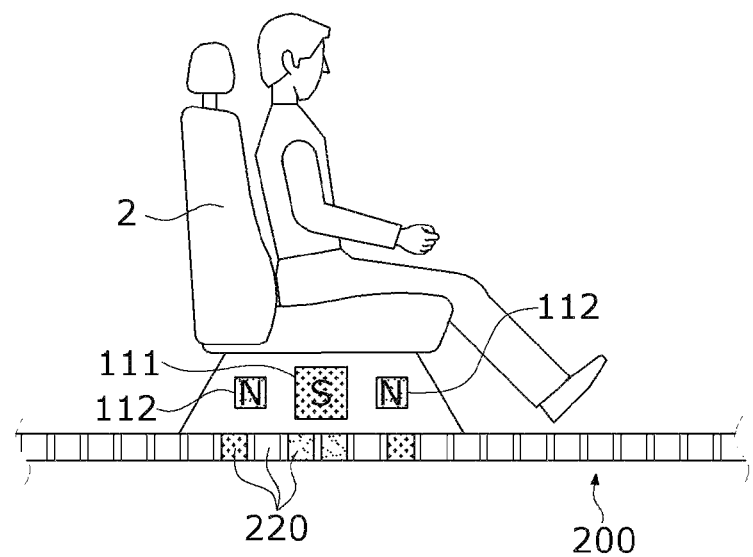

FIGS. 6 and 7 are views showing a movement mechanism of the seat unit for the vehicle according to the embodiment, and FIGS. 8 and 9 are views showing the seat unit fixed to the electromagnet unit for the vehicle according to the embodiment. The arrows shown in FIGS. 6 and 7 indicate a moving direction of the seat unit. In addition, the electromagnet 220 in which hatching is not displayed among the electromagnets 220 shown in FIG. 6 may indicate an off state.

Referring to FIGS. 6 and 7, the electromagnet 220 disposed to vertically overlap the first magnet 111 by the control unit 300 of the vehicle may levitate the seat 2 by forming the same magnetic polarity as that of the first magnet 111. For example, when the first magnet 111 has an S polarity, the electromagnet 220 disposed to vertically overlap the first magnet 111 may levitate the seat 2 by implementing the S polarity.

In addition, the electromagnet 220 disposed to vertically overlap the second magnet 112 by the control unit 300 of the vehicle may levitate the seat 2 by forming the same magnetic polarity as that of the second magnet 112. For example, when the second magnet 112 has an N polarity, the electromagnet 220 disposed to vertically overlap the second magnet 112 may function to assist the levitation of the seat 2 by implementing the N polarity.

In addition, the electromagnets 220 disposed in the moving direction may sequentially form magnetic polarities different from those of the second magnets 112 by the control unit 300 with respect to the moving direction of the seat 2. Accordingly, since an attractive force is generated between the second magnet 112 and the electromagnet 220 disposed in the moving direction, the seat 2 moves along the moving direction.

When the seat 2 is moved, the electromagnet 220 disposed to vertically overlap the first magnet 111 may maintain the magnetic levitation force by forming the same magnetic polarity as that of the first magnet 111.

In addition, the electromagnet 220 disposed in an opposite direction to the moving direction may form the same magnetic polarity as that of the second magnet 112 by the control unit 300. Accordingly, the seat 2 may move in the moving direction more effectively.

Meanwhile, when the seat 2 is moved, the electromagnet 220 other than the electromagnet 220 in which the magnetic polarity is formed according to the application of power may be in an off state because power is not applied thereto.

Referring to FIG. 8, after the seat 2 is completely moved to a set position, the control unit 300 may release the power applied to the electromagnet 220. Accordingly, the magnet unit 100 may be fixed to an upper portion of the electromagnet unit 200 by the magnetic force formed in the magnet unit 100. For example, when the seat 2 reaches the set position, the control unit 300 may fix the magnet unit 100 to the upper portion of the electromagnet unit 200 by releasing the power applied to the electromagnet 220.

Furthermore, when the seat 2 reaches the set position, the control unit 300 may form the magnetic polarities of some of the electromagnets 220 vertically overlapping the magnet 110 as a magnetic polarity different from that of the magnet 110 (see FIG. 9). Accordingly, a fixing force of the seat 2 can be further improved.

Figure 10:
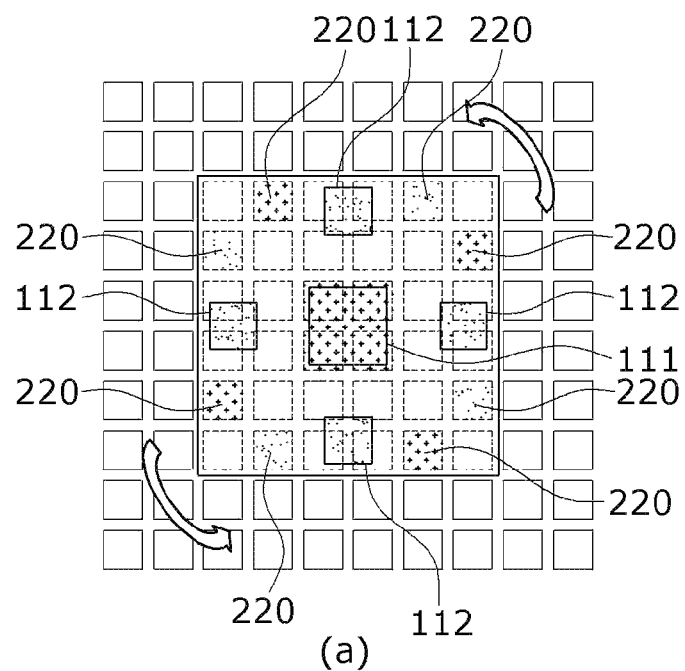
FIG. 10 is a view showing a rotation mechanism of the seat unit of the vehicle according to the embodiment.
Figure 10:
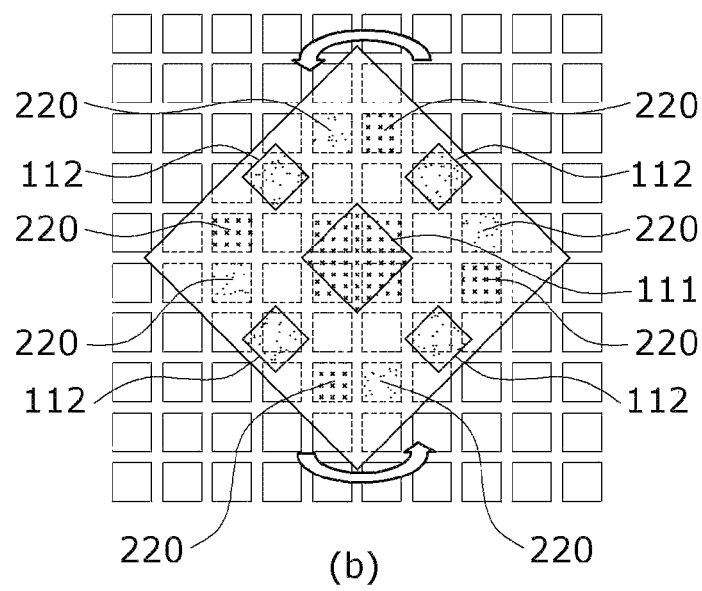

FIG. 10 is a view showing a rotation mechanism of the seat unit for the vehicle according to the embodiment. Here, the arrows shown in FIG. 10 indicate a rotating direction of the seat unit.

Referring to FIG. 10, the seat 2 may rotate through the electromagnet 220 controlled by the control unit 300.

The electromagnet 220 disposed adjacent to the second magnet 112 in the rotating direction with respect to the rotating direction of the seat 2 may form a magnetic polarity different from that of the second magnet 112 by the control unit 300. In addition, the electromagnet 220 disposed adjacent to the second magnet 112 in the opposite direction to the rotating direction may form the same magnetic polarity as that of the second magnet 112 by the control unit 300. At this time, the electromagnet 220 disposed to vertically overlap the second magnet 112 may be in an off state. Accordingly, the seat 2 may rotate smoothly. Here, the term "adjacent"

may refer to being disposed close to each other even while having a predetermined separation distance in the rotating direction.

When the seat 2 is rotated, the electromagnet 220 disposed adjacent to the second magnet 112 in the opposite direction of the rotating direction forms the same magnetic polarity as that of the second magnet 112 as an example, but the present invention is not necessarily limited thereto. For example, when the seat 2 is rotated, the electromagnet 220 disposed adjacent to the second magnet 112 in the opposite direction to the rotating direction may also be in an off state. However, when the electromagnet 220 disposed adjacent to the second magnet 112 in the opposite direction to the rotating direction is in an off state, it is also possible to rotate the seat 2 more quickly by a rotational inertia of the seat 2.

Meanwhile, an impact such as a collision may occur in the vehicle. In particular, when the vehicle is driven, the collision acts as a factor harmful to the passenger's safety.

Accordingly, the vehicle according to the embodiment can more safely protect the passenger by moving the seat 2 away from a collision position (point) in response to the collision.

Figure 11:
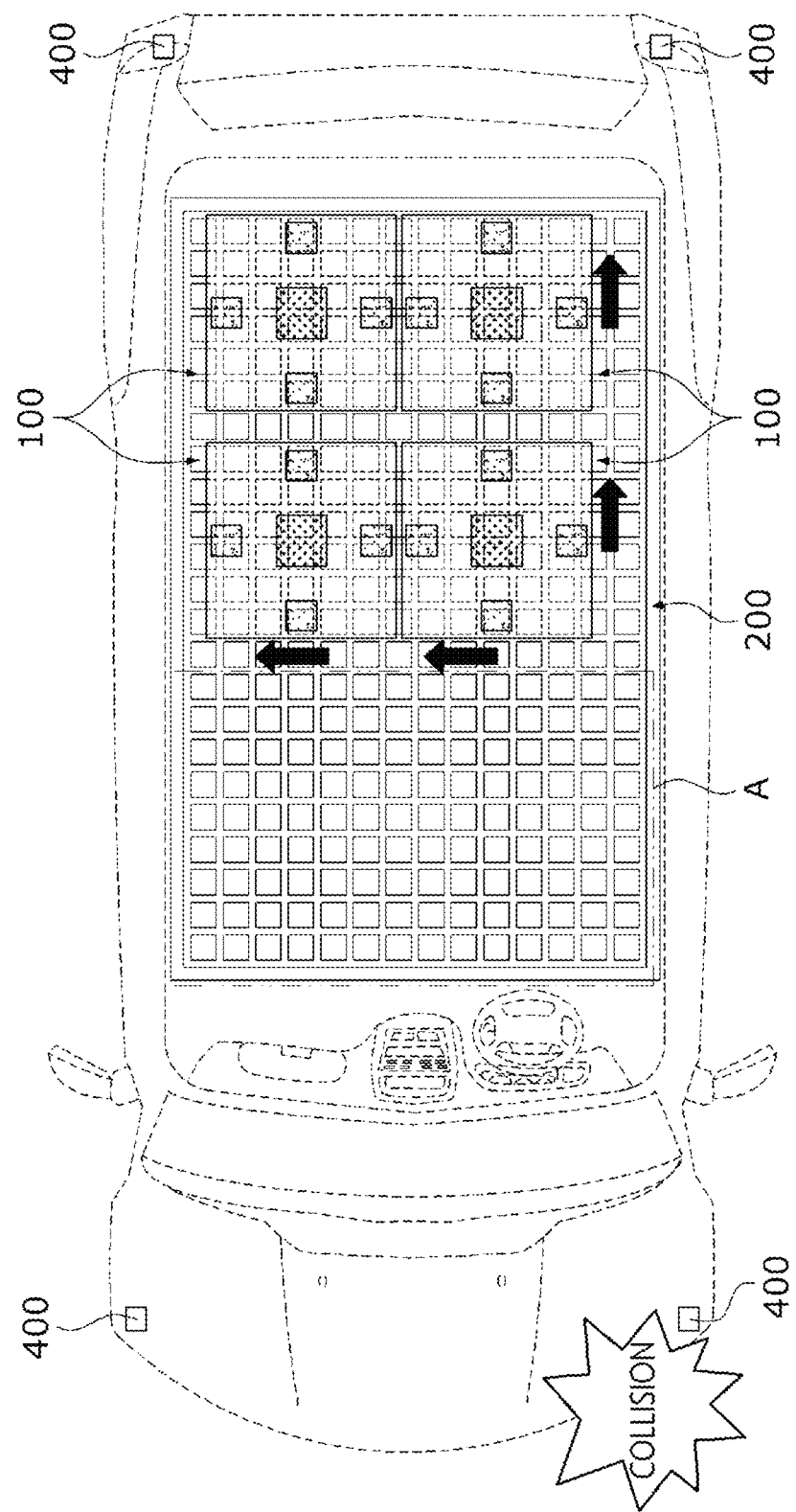
FIG. 11 is a view showing the movement mechanism of the seat unit of the vehicle according to the embodiment when a collision of the vehicle is detected.

FIG. 11 is a view showing the movement mechanism of the seat unit for the vehicle according to the embodiment when the collision of the vehicle is detected.

Referring to FIG. 11, the vehicle may further include a sensor 400 configured to detect a collision. Here, the sensor 400 may be referred to as a collision detection sensor or a first sensor so as to be distinguished from the load sensor.

The sensor 400 may detect a distance or collision with an object around the vehicle.

In addition, the sensor 400 may provide the object and distance information to the control unit 300. Accordingly, the control unit 300 may determine the possibility of collision with the object, and control the electromagnet unit 200 to move the seat 2 away from the collision position. At this time, the movement of the seat 2 may use the above-described movement mechanism.

Accordingly, as the seat 2 moves away from the collision position, a buffer area A may be formed on the electromagnet 200, and the passenger can be more safely protected through the buffer area A.

Meanwhile, when the collision is detected by the sensor 400, the electromagnet 220 disposed to vertically overlap the first magnet 111 may further improve a fixing force of the seat 2 by forming a magnetic polarity different from that of the first magnet 111 by the control unit 300. At this time, the electromagnet 220 disposed to vertically overlap the second magnet 112 may further improve the fixing force of the seat 2 by forming a magnetic polarity different from that of the second magnet 112 by the control unit 300.

Accordingly, the passenger can be more safely protected.

Figure 12:
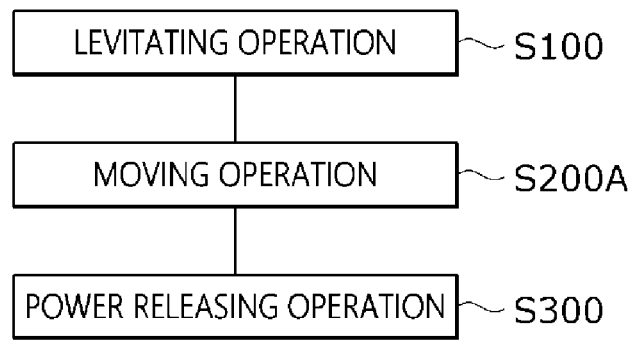
FIG. 12 is a block diagram showing one embodiment of a method of controlling a seat for a vehicle according to the embodiment.
Figure 13:
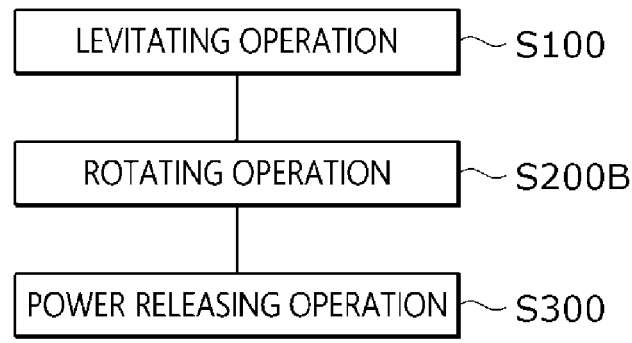
FIG. 13 is a block diagram showing another embodiment of the method of controlling the seat for the vehicle according to the embodiment.

FIG. 12 is a block diagram showing a control method of moving a seat for a vehicle according to the embodiment, and FIG. 13 is a block diagram showing a control method of rotating a seat for a vehicle according to the embodiment.

Hereinafter, a method of controlling a seat for a vehicle will be described with reference to FIGS. 12 and 13.

Referring to FIG. 12, a control method (S1) of moving a seat for a vehicle according to the embodiment may include: a levitating operation (S100) of levitating a seat having a magnet disposed on a lower portion by applying power to an electromagnetic unit in which a plurality of electromagnets are disposed; a moving operation (S200A) of moving the seat by controlling an electromagnet disposed in a moving direction of the seat; and a power releasing operation (S300) of releasing power applied to the electromagnet when the seat reaches a preset position.

Referring to FIG. 6, in the levitating operation (S100), the seat 2 may be levitated by applying power to form the same magnetic polarity as that of the first magnet 111 on the electromagnet 220 disposed to vertically overlap the first magnet 111.

In addition, the seat 2 may be levitated by forming the same magnetic polarity as that of the second magnet 112 on the electromagnet 220 disposed to vertically overlap the second magnet 112.

Referring to FIGS. 6 and 7, in the moving operation (S200A), magnetic polarities different from those of the second magnets 112 may be sequentially formed on the electromagnets 220 disposed in the moving direction. Accordingly, an attractive force is generated between the second magnet 112 and the electromagnet 220 disposed in the moving direction, and thus the seat 2 moves in the moving direction.

Referring to FIG. 8, in the power releasing operation (S300), when the seat 2 reaches the set position, the magnetic unit 100 may be fixed to an upper portion of the electromagnetic unit 200 by releasing the power applied to the electromagnet 220.

Meanwhile, the control method (S1) of moving the seat for the vehicle according to the embodiment may further include a fixing force improving operation, which is an operation of improving the fixing force of the seat.

In the fixing force improving operation, when the seat 2 reaches the set position, it is possible to improve the fixing force of the seat 2 by forming magnetic polarities of some of the electromagnets 220 vertically overlapping the magnet 110 as a magnetic polarity different from that of the magnet 110.

Referring to FIG. 13, a control method (S2) of rotating a seat for a vehicle according to the embodiment may include: a levitating operation (S100) of levitating a seat having a magnet disposed on a lower portion by applying power to an electromagnetic unit in which a plurality of electromagnets are disposed; a rotating operation (S200) of rotating the seat by controlling the electromagnet disposed in a rotating direction of the seat; and a power releasing operation (S300) of releasing the power applied to the electromagnet when the seat reaches a preset position.

Referring to FIG. 6, in the levitating operation (S100), the seat 2 may be levitated by applying power to form the same magnetic polarity as that of the first magnet 111 on the electromagnet 220 disposed to vertically overlap the first magnet 111.

In addition, the seat 2 may be levitated by forming the same magnetic polarity as that of the second magnet 112 on the electromagnet 220 disposed to vertically overlap the second magnet 112.

Referring to FIG. 10, in the rotating operation (S200B), magnetic polarities different from those of the second magnet 112 may be sequentially formed on the electromagnets 220 disposed adjacent to the second magnet 112 in the rotating direction. Accordingly, an attractive force is generated between the second magnet 112 and the electromagnet 220 disposed adjacent to the second magnet 112 in the rotating direction, and thus the seat 2 rotates in the rotating direction.

Referring to FIG. 8, in the power releasing operation (S300), when the seat 2 reaches the set position, the magnetic unit 100 may be fixed to an upper portion of the electromagnetic unit 200 by releasing the power applied to the electromagnet 220.

Meanwhile, the control method (S2) of moving the seat for the vehicle according to the embodiment may further include a fixing force improving operation, which is an operation of improving a fixing force of the seat.

In the fixing force improving operation, when the seat 2 reaches the set position, it is possible to improve the fixing force of the seat 2 by forming magnetic polarities of some of the electromagnets 220 vertically overlapping the magnet 110 as a magnetic polarity different from that of the magnet 110.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle comprising:
    a magnetic unit disposed under a seat of the vehicle and including a plurality of magnets, the plurality of magnets including:
        a first magnet having a first magnetic polarity and disposed at a center portion of the magnetic unit; and
        a plurality of second magnets having a second magnetic polarity different from the first magnetic polarity and spaced apart from and surrounding the first magnet;
    an electromagnetic unit disposed on a floor of a vehicle compartment and including a plurality of electromagnets; and
    a control unit configured to control a current applied to each of the plurality of electromagnets to cause the seat to move to a preset position on the electromagnetic unit.

2. The vehicle of claim 1, wherein the magnetic unit includes a body at which the plurality of magnets are disposed.

3. The vehicle of claim 2, wherein the first magnet has a size greater than that of each second magnet.

4. The vehicle of claim 3, wherein each second magnet has a size greater than that of each electromagnet.

5. The vehicle of claim 4, wherein a first distance between the first magnet and each second magnet is greater than a second distance between the plurality of electromagnets.

6. The vehicle of claim 2, wherein:
    the electromagnetic unit includes a frame,
    the plurality of electromagnets are disposed at the frame and spaced apart from each other, and
    to cause the seat to move to the preset position on the electromagnetic unit, the control unit is configured to cause a first electromagnet group, which includes at least one of the plurality of electromagnets vertically overlapping the first magnet, to have the first magnetic polarity.

7. The vehicle of claim 6, wherein, to cause the seat to move to the preset position on the electromagnetic unit, the control unit is configured to cause a second electromagnet group, which includes at least one of the plurality of electromagnets disposed in a moving direction of the seat, to have the first magnetic polarity.

8. The vehicle of claim 7, wherein to cause the seat to move to the preset position on the electromagnetic unit, the control unit is configured to cause a third electromagnet group, which includes at least one of the plurality of electromagnets disposed in a direction opposite to the moving direction of the seat, to have the second magnetic polarity.

9. The vehicle of claim 8, wherein the control unit is configured to stop supplying power to the plurality of electromagnets when the seat reaches the preset position on the electromagnetic unit.

10. The vehicle of claim 8, wherein the control unit is configured, when the seat reaches the preset position, to:
    cause each electromagnet vertically overlapping the first magnet to have the second magnetic polarity; and
    cause each electromagnet vertically overlapping one of the plurality of second magnets to have the first magnetic polarity.

11. The vehicle of claim 6, wherein the control unit is configured to cause a second electromagnet group, which includes at least one of the plurality of electromagnets disposed adjacent to the second magnet in a rotating direction of the seat, to have the first magnetic polarity.

12. The vehicle of claim 11, wherein the control unit is configured to cause a third electromagnet group, which includes at least one of the plurality of electromagnets disposed adjacent to the second magnet in a direction opposite to the rotating direction of the seat, to have the second magnetic polarity.

13. The vehicle of claim 12, wherein each electromagnet vertically overlapped by one of the plurality of second magnets is in an off state.

14. The vehicle of claim 2, further comprising a sensor configured to detect a collision, wherein the control unit is configured to determine a possibility of collision based on a collision signal generated by the sensor and control the electromagnetic unit to move the seat away from a collision position to create a buffer area in the vehicle compartment.

15. The vehicle of claim 14, wherein the control unit is configured to cause an electromagnet group, which includes at least one of the plurality of electromagnets vertically overlapping the first magnet, to have the second magnetic polarity when a collision is detected by the sensor.

16. The vehicle of claim 1, wherein:
    the electromagnetic unit includes a frame,
    the plurality of electromagnets are disposed at the frame and spaced apart from each other,
    each electromagnet includes a power supply unit electrically connected to a coil, and
    the control unit is configured to control the power supply unit.

17. The vehicle of claim 1, wherein each of the plurality of magnets comprises a superconducting magnet.

18. The vehicle of claim 1, further comprising a load sensor disposed at the seat, wherein the control unit is configured to control the electromagnetic unit based on a load signal generated by the load sensor.

19. A method of moving a seat of a vehicle, comprising:
    supplying power to an electromagnetic unit including a plurality of electromagnets for levitating the seat disposed above the electromagnetic unit, the seat comprising a magnetic unit disposed at a lower portion of the seat, the magnetic unit comprising:
  a first magnet having a first magnetic polarity and disposed at a center portion of the magnetic unit; and
  a plurality of second magnets having a second magnetic polarity different from the first magnetic polarity and spaced apart from and surrounding the first magnet;
controlling a first electromagnet group, which includes at least one of the plurality of electromagnets vertically overlapping the first magnet, to have the first magnetic polarity;
controlling a second electromagnet group, which includes at least one of the plurality of electromagnets disposed in a moving direction to a preset position, to have the first magnetic polarity; and
releasing power supplied to the second electromagnet group when the seat reaches the preset position.

20. A method of rotating a seat of a vehicle, comprising:
supplying power to an electromagnetic unit including a plurality of electromagnets to levitate the seat disposed above the electromagnetic unit, the seat comprising a magnetic unit disposed at a lower portion of the seat, the magnetic unit comprising:
  a first magnet having a first magnetic polarity and disposed at a center portion of the magnetic unit; and
  a plurality of second magnets having a second magnetic polarity different from the first magnetic polarity and spaced apart from and surrounding the first magnet;
controlling a first electromagnet group, which includes at least one of the plurality of electromagnets vertically overlapping the first magnet, to have the first magnetic polarity;
controlling a second electromagnet group, which includes at least one of the plurality of electromagnets disposed adjacent to the lower portion of the seat in a rotating direction of the seat, to have the first magnetic polarity to rotate the seat; and
releasing power supplied to the second electromagnet group when the seat reaches a preset position.

* * * * *